(12) United States Patent
Woo

(10) Patent No.: US 10,692,084 B2
(45) Date of Patent: Jun. 23, 2020

(54) MEMBERSHIP CARD LENDING SERVICE METHOD AND DEVICE THEREFOR

(71) Applicant: SK PLANET CO., LTD., Seongnam-si, Gyeonggi-do (KR)

(72) Inventor: Jongwon Woo, Incheon (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 780 days.

(21) Appl. No.: 15/394,320

(22) Filed: Dec. 29, 2016

(65) Prior Publication Data
US 2017/0109753 A1    Apr. 20, 2017

Related U.S. Application Data

(63) Continuation of application No. PCT/KR2015/013704, filed on Dec. 15, 2015.

(30) Foreign Application Priority Data

Jun. 19, 2015  (KR) .................. 10-2015-0087356

(51) Int. Cl.
*G06Q 40/00* (2012.01)
*G06Q 20/40* (2012.01)
(Continued)

(52) U.S. Cl.
CPC ....... *G06Q 20/4014* (2013.01); *G06Q 20/327* (2013.01); *G06Q 30/02* (2013.01);
(Continued)

(58) Field of Classification Search
USPC ......... 705/39, 38, 37, 36; 343/853; 235/379, 235/382; 702/158; 370/335, 320;
(Continued)

(56) References Cited

U.S. PATENT DOCUMENTS 6,227,447 B1 * 5/2001 Campisano .......... G06Q 20/385
235/380
6,311,167 B1 * 10/2001 Davis ..................... G06Q 20/10
705/35

(Continued)

FOREIGN PATENT DOCUMENTS

JP         2012-221014 A    11/2012
KR   10-2012-0087249 A     8/2012
(Continued)

OTHER PUBLICATIONS

A study on the users' behaviors of P2P online lending platforms, 2015 12th International Conference on Service Systems and Service Management (ICSSSM) (pp. 1-4), Jing Fan, Long Peng, Yi Du, Sihan Li. (Year: 2015).*

(Continued)

*Primary Examiner* — Tien C Nguyen
(74) *Attorney, Agent, or Firm* — Fenwick & West LLP

(57) ABSTRACT

The present invention relates to a membership card rental service method and apparatus for renting a user's membership card, stored in a user terminal having short-range wireless communication, to other user terminal. The user terminal according to an embodiment of this invention has the short-range wireless communication function and may include a rental service module configured to transmit membership card information to other user terminal through the short-range wireless communication function in response to a membership card rental request, to switch a membership card to an inactivated mode at the user terminal for use of the membership card at the other user terminal, and to switch the inactivated mode to an activated mode when the membership card used at the other user terminal is withdrawn, and a membership card managing module con- (Continued)

figured to manage the membership card information and an activation or not of the membership card.

12 Claims, 10 Drawing Sheets

(51) Int. Cl.
*G06Q 30/06* (2012.01)
*G06Q 30/02* (2012.01)
*H04L 9/32* (2006.01)
*G06Q 20/32* (2012.01)

(52) U.S. Cl.
CPC ......... *G06Q 30/06* (2013.01); *G06Q 30/0645* (2013.01); *H04L 9/3226* (2013.01)

(58) Field of Classification Search
USPC ........................................................ 455/454
See application file for complete search history.

(56) References Cited

U.S. PATENT DOCUMENTS

| | | | | |
|---|---|---|---|---|
| 6,473,055 | B2* | 10/2002 | Kohno | G01S 3/325 |
| | | | | 342/357.64 |
| 8,762,216 | B1* | 6/2014 | Bhosle | G06Q 40/02 |
| | | | | 705/26.1 |
| 2005/0195768 | A1* | 9/2005 | Petite | H04B 1/406 |
| | | | | 370/335 |
| 2007/0226051 | A1* | 9/2007 | Addepalli | G06Q 30/02 |
| | | | | 705/80 |
| 2008/0052226 | A1* | 2/2008 | Agarwal | G07F 7/1075 |
| | | | | 705/39 |
| 2008/0177635 | A1* | 7/2008 | Handel | G06Q 20/10 |
| | | | | 705/26.1 |
| 2008/0183581 | A1 | 7/2008 | Coppolani et al. | |
| 2008/0186898 | A1* | 8/2008 | Petite | H04W 40/00 |
| | | | | 370/315 |
| 2011/0302016 | A1 | 12/2011 | Haddad | |
| 2014/0324973 | A1 | 10/2014 | Goel et al. | |

FOREIGN PATENT DOCUMENTS

| | | |
|---|---|---|
| KR | 10-2013-0081962 A | 7/2013 |
| KR | 10-2014-0012315 A | 2/2014 |
| KR | 10-2015-0011418 A | 2/2015 |

OTHER PUBLICATIONS

NFC Smart Tourist Card: Combining Mobile and Contactless Technologies towards a Smart Tourist Experience, 2014 IEEE 23rd International WETICE Conference (pp. 249-254), Alessandra Basili, Walter Liguori, Federica Palumbo. (Year: 2014).*

Extended European Search Report dated Nov. 14, 2018 for European Application No. 15895748.0, 8 pages.

International Search Report dated Mar. 31, 2016, corresponding to International Publication No. PCT/KR2015/013704, citing the above reference(s).

* cited by examiner

MEMBERSHIP CARD LENDING SERVICE METHOD AND DEVICE THEREFOR

CROSS REFERENCE

The present application is a continuation of International Patent Application No. PCT/KR2015/013704, filed Dec. 15, 2015, which is based upon and claims the benefit of priority to Korean Patent Application No. 10-2015-0087356, filed on Jun. 19, 2015. The disclosures of the above-listed applications are hereby incorporated by reference herein in their entirety.

TECHNICAL FIELD

The present invention relates to a membership card rental service method and an apparatus therefor, and more particularly, to a membership card rental service method and apparatus for renting a membership card by providing membership card information, managed at a user terminal having short-range communication, to another user terminal and performing authorization.

BACKGROUND ART

Details disclosed in this section merely offer background information as to embodiments of the present invention and do not constitute prior art.

With the remarkable development of a mobile communication network and related technologies, mobile communication devices have outgrown a typical category of simple communication devices or information providing devices and are now evolving into total entertainment devices.

In addition, technologies for short-range communication between devices are now developing rapidly, and a mobile communication device often has a function of short-range communication such as NFC (Near Field Communication) or Bluetooth as well as a communication function using a mobile communication network.

NFC covers a narrower communication range and needs an additional wireless chip, whereas Bluetooth covers a wider communication range and is inherently applied to most of recent mobile communication devices. Therefore, a variety of communication services using Bluetooth are developed and launched.

Recently, Bluetooth low energy (BLE) technology (Bluetooth 4.0) has been widely used in smart phones, retail geofencing, mobile payment, and the like.

Meanwhile, in recent years, various services are offered through applications that can be executed in such mobile communication terminals. For example, various kinds of applications such as a communication application including a messenger application for chatting with a lot of users by transmitting and receiving a message, an electronic wallet application for offering various membership cards, discount coupons, saving cards, and the like. In particular, the electronic wallet application has a feature that the user can conveniently use a member store service by integrally managing the membership card, the discount coupon, and the saving card for the member store.

A service such as a membership card managed in the electronic wallet application manages a user's own membership card through each unique account, which makes it difficult for a user to lend such a membership card to a friend. In addition, in order for a user to lend a membership card to a friend, it is necessary to directly transmit a mobile communication terminal or to share user's personal account information, thus posing a problem regarding an exposure of personal information.

DISCLOSURE

Technical Problem

The present invention relates to a method for renting a user's membership card to another user terminal at a user terminal having a short-range wireless communication function, and has an object of allowing a user's membership card to be used at another user's terminal by using short-range wireless communication without renting the user terminal.

More specifically, the present invention has an object of providing a membership card rental service method and apparatus for switching the membership card to an inactivated mode at a user terminal when the user's membership card is rented to another user, and for switching the membership card to an activated mode at the user terminal when the membership card is withdrawn in response to a user's request.

However, the object of the present invention is not limited to the above-mentioned objects, and any other object not mentioned may be clearly understood from the following description.

Technical Solution

In order to accomplish objects as discussed above, a user terminal according to an embodiment of this invention may have a short-range wireless communication function and include a rental service module configured to transmit membership card information to other user terminal through the short-range wireless communication function in response to a membership card rental request, to switch a membership card to an inactivated mode at the user terminal for use of the membership card at the other user terminal, and to switch the inactivated mode to an activated mode when the membership card used at the other user terminal is withdrawn; and a membership card managing module configured to manage the membership card information and an activation or not of the membership card.

The user terminal may further include a use condition setting module configured to set at least one of a usable count, a usage limit, and an expiration with regard to the membership card to be offered to the other user terminal.

In the user terminal, the rental service module may be further configured to perform authorization by entering a signature or password when receiving an authorization request for use of the membership card from the other user terminal.

In the user terminal, the rental service module may be further configured to switch the membership card to the activated mode at the other user terminal when switching the membership card to the inactivated mode at the user terminal.

In the user terminal, the rental service module may be further configured to delete membership card information from the other user terminal or to switch the membership card stored in the other user terminal to the inactivated mode when the membership card is withdrawn.

In the user terminal, the rental service module may be further configured to release a short-range wireless communication connection from the other user terminal by adjusting emission signal strength of the short-range wireless communication function when the membership card used at the other user terminal is withdrawn.

In the user terminal, the rental service module may be further configured to determine whether to withdraw the membership card, depending on received signal strength of a short-range wireless communication signal received from the other user terminal.

In order to accomplish objects as discussed above, a membership card rental service method according to an embodiment of this invention may include steps of, at a user terminal, detecting one or more other user terminals through a short-range wireless communication function; at the user terminal, receiving a membership card rental request; at the user terminal, transmitting membership card information to the other user terminal through the short-range wireless communication function; at the user terminal, switching a membership card to an inactivated mode at the user terminal; at the user terminal, switching the inactivated mode to an activated mode when the membership card used at the other user terminal is withdrawn; and at the user terminal, managing the membership card information and an activation or not of the membership card.

In the method, the transmitting step may include step of setting at least one of a usable count, a usage limit, and an expiration with regard to the membership card to be offered to the other user terminal.

The method may further include step of, after the step of switching to the inactivated mode, performing authorization by entering a signature or password when receiving an authorization request for use of the membership card from the other user terminal.

In the method, the step of switching to the inactivated mode may include step of switching the membership card to the activated mode at the other user terminal.

In the method, the step of switching to the activated mode may include step of deleting membership card information from the other user terminal or switching the membership card stored in the other user terminal to the inactivated mode when the membership card is withdrawn.

In the method, the step of switching to the activated mode may include step of releasing a short-range wireless communication connection from the other user terminal by adjusting emission signal strength of the short-range wireless communication function when the membership card is withdrawn.

The method may further include step of, before the step of switching to the activated mode, determining whether to withdraw the membership card, depending on received signal strength of a short-range wireless communication signal received from the other user terminal.

Advantageous Effects

According to the present invention, a membership card in an electronic wallet application of a user terminal can be rented to another user by using short-range wireless communication, thereby reducing the risk of losing to the user terminal.

In addition, upon rental of a user's membership card, a lender's membership card is switched to an inactivated mode, and a borrower's membership card is switched to an activated mode. Further, upon withdrawal of the membership card, the lender's membership card is switched to the activated mode, and the borrower's membership card is switched to the inactivated mode. It is therefore possible to prevent collision due to use of two or more users with regard to one membership card usage authority.

In addition, since a membership card is rented by setting a use condition for the rented membership card and also since the membership card that fails to meet the use condition can be withdrawn, this may prevent an additional or fraudulent use of the membership card.

Other various advantages and effects will be disclosed explicitly or implicitly in embodiments of this invention to be described below in detail.

MODE FOR INVENTION

Figure 1:
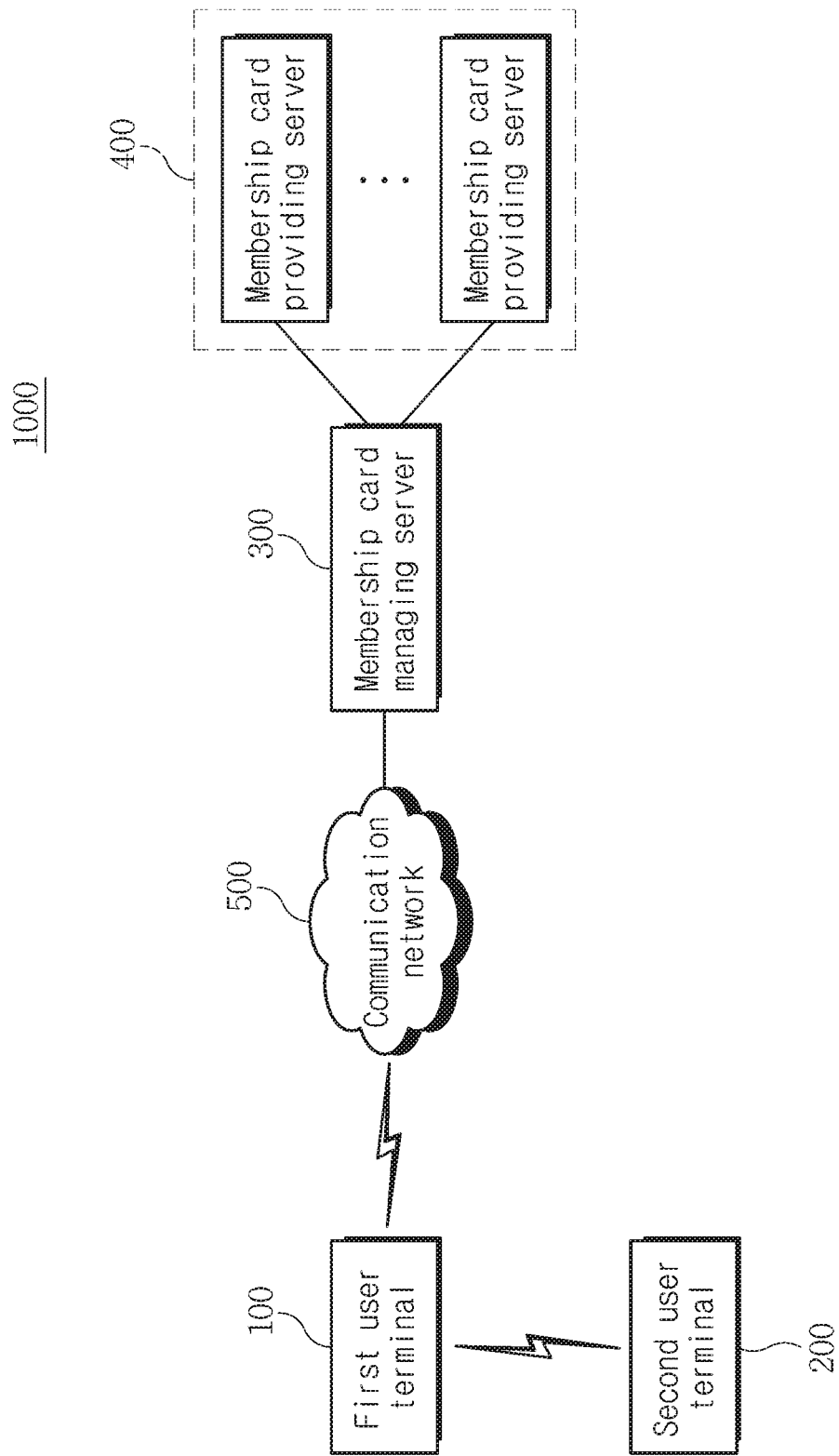
FIG. 1 is a diagram illustrating a schematic configuration of a membership card rental service system according to an embodiment of the present invention.

Now, embodiments of the present invention will be described with reference to the accompanying drawings.

In the following description and the accompanying drawings, however, well known techniques may not be described or illustrated in detail to avoid obscuring the subject matter of the present invention. Through the drawings, the same or similar reference numerals denote corresponding features consistently.

The terms and words used in the following description, drawings and claims are not limited to the bibliographical meanings and are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The expression "first", "second", and the like used in various embodiments of this disclosure may modify various elements of such embodiments but does not limit the corresponding elements. The above expressions do not limit the sequence and/or importance of the elements but may be used for distinguishing one element from other elements. For example, a first device and a second device indicate different devices although both of them are devices.

When it is stated that a certain element is "coupled to" or "connected to" another element, the element may be directly coupled or connected to another element, or a new element may exist between both elements. In contrast, when it is stated that a certain element is "directly coupled to" or "directly connected to" another element, a new element does not exist between both elements.

The terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise" and "have" as well as derivatives thereof, mean inclusion without limitation.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links (of possibly different speeds) that enable the transport of electronic data between computer systems and/or modules (e.g., hardware and/or software modules). When information is transferred or provided over a network or another communications connection (either hardwired, wireless, or a combination of hardwired or wireless) to a computer system, the connection is properly viewed as a computer-readable medium. Computer-executable instructions include, for example, instructions and data which cause a general-purpose computer system or special-purpose computer system to perform a certain function or group of functions. The computer executable instructions may be, for example, binaries, intermediate format instructions such as assembly language, or even source code.

Additionally, the present invention may be practiced in network computing environments that have various kinds of computer system configuration including personal computers, laptop computers, hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Although a membership card rental service according to the present invention is described based on Bluetooth data communication technology, this invention is not limited thereto. The membership card rental service according to the invention can be performed if data communication is a short-range wireless communication manner. The short-range wireless communication technology may use NFC (Near Field Communication), Zigbee, UWB (Ultra WideBand), ANT, Wi-Fi, and PAN (Personal Area Network). While NFC may be applicable only within several tens of centimeters, Bluetooth may be available in a range of several tens of meters and thus widely applied to various fields. In particular, Bluetooth allows data delivery without having to bring it close to a reader like NFC.

Now, a method and apparatus for a membership card rental service according to an embodiment of the present invention will be described with reference to the accompanying drawings.

At the outset, a membership card rental service system according to an embodiment of the present invention will be described schematically.

FIG. 1 is a diagram illustrating a schematic configuration of a membership card rental service system according to an embodiment of the present invention.

Referring to FIG. 1, the membership card rental system 1000 according to an embodiment of this invention may include a first user terminal 100 for renting out a membership cart, a second user terminal 200 for renting the membership card from the first user terminal, a membership card managing server 300 for managing a membership card according to an embodiment of this invention, a membership card providing server 400 for providing a membership card for each member store, and a communication network 500.

The first user terminal 100 according to an embodiment of this invention may transmit or receive data by communicating with the second user terminal 200 and the membership card managing server 300, based on wired/wireless communication. Particularly, the first and second user terminals 100 and 200 are connected with each other, using a short-range wireless communication such as Bluetooth communication.

Specifically, each of the first and second user terminals 100 and 200 refers to a user's apparatus capable of transmitting or receiving various kinds of data via the communication network according to user's manipulations.

The first and second user terminals 100 and 200 may perform voice or data communication through the communication network and may have a memory for storing a browser, program and protocol for transmission and/or reception of information, a microprocessor for executing and controlling programs, and other elements required inherently or optionally.

Particularly, the first user terminal 100 according to an embodiment of this invention is a terminal apparatus owned by a user account of a membership card managed by the membership card managing server 300, and refers to an apparatus for connecting with the second user terminal 200 through Bluetooth communication and renting the membership card to the second user terminal in response to a membership card rental request of the first user terminal.

Additionally, the second user terminal 200 according to an embodiment of this invention is connected with the first user terminal 100 through Bluetooth communication, and refers to a user terminal for renting the membership card from the first user terminal 100.

Also, the membership card rental request is performed by an input of a user of the first user terminal 100. The first user terminal 100 according to this invention may activate a short-range wireless communication function and thereby detect one or more other user terminals which activate the short-range wireless communication function and are located within an emitting signal range of the first user terminal 100.

Additionally, the first user terminal 100 according to an embodiment of this invention may select the second user terminal 200, to which a membership card will be rented, from among one or more detected user terminals, select the membership card to be rented to the second user terminal 200, and offer membership card information to the second user terminal.

Here, before offering the membership card information, the first user terminal 100 may set use conditions that define at least one of a usable count, a usage limit, and an expiration with regard to a membership card to be rented.

When information about the membership card selected by the first user terminal 100 is offered to the second user terminal 200, the membership card is switched to an inactivated mode at the first user terminal 100 and to an activated mode at the second user terminal 200.

Thereafter, if the second user terminal 200 requests the use of the membership card from the membership card managing server 300, namely, after a request for using the membership card, the first user terminal 100 performs authorization by entering a signature or password so as to authorize the use of membership card at the second user terminal 200.

Additionally, when the first user terminal 100 withdraws the membership card being in an activated mode at the second user terminal 200, the membership card may be switched to an inactivated mode at the second user terminal 200 or related information may be deleted, and the membership card may be switched to an activated mode at the first user terminal 100.

Detailed operating methods of the first and second user terminals 100 and 200 will be described below. In embodiments of this invention, the first and second user terminals 100 and 200 may be implemented in various forms.

For example, the user terminal disclosed herein may be a mobile device such as a smart phone, a tablet personal computer (tablet PC), a personal digital assistant (PDA), a portable multimedia player (PMP), an MP3 player, and the like, or a stationary device such as a smart TV, a desktop computer, and the like.

According to a recent trend of convergence in digital devices, a great variety of mobile devices or their equivalences may be used as the first and second user terminals 100 and 200. Further, any device that can transmit or receive information to or from the membership card managing server 300 through the communication network 500 may be used as the first and second user terminals 100 and 200 in embodiments of this invention.

A processor embedded in each apparatus according an embodiment of this invention may process a program command for executing the method of this invention. This processor may be a single-threaded processor or a multi-threaded processor. Also, this processor may process commands stored in a memory or any other storage.

The membership card managing server 300 according to an embodiment of this invention generally manages user's membership cards through an electronic wallet application at a user terminal such as the first user terminal 100 and the second user terminal 200, and performs a function of storing membership cards, offered from the membership card providing server 400 corresponding to each member store, and managing membership card information.

Additionally, the membership card managing server 300 according to an embodiment of this invention is a server for detecting and managing an activated mode and an inactivated mode according to rental and withdrawal of a membership card at the first and second user terminals 100 and 200. If the first user terminal 100 rents a specific membership card to the second user terminal 200, the membership card is switched to an inactivated mode at the first user terminal 100, and the membership card managing server 300 may store activation information and authorization information of the membership card when the membership card of an account of the first user terminal 100 is switched to an activated mode at the second user terminal 200.

Additionally, when a request for using a membership card is received from the second user terminal 200, the membership card managing server 300 according to an embodiment of this invention performs an authorization request as follows.

In an authorization procedure, the membership card managing server 300 according to an embodiment of this invention may receive a request for the use of a membership card from the second user terminal 200 and then request for the authorization of the membership card from the first user terminal 100 so as to offer the usage authority for the membership card to the second user terminal 200.

If the first user terminal 100 performs authorization by entering a signature or password in response to this request, the membership card managing server 300 may approve the use of membership card by the second user terminal 200.

The membership card providing server 400 according to an embodiment of this invention is a server for creating a membership card of each member store that uses the membership card rental service, and may provide the created membership card to the membership card managing server 300.

In addition, the first user terminal 100, the second user terminal 200, and the membership card managing server 300 of this invention interwork with each other through the communication network. This communication network 500 is a network capable of transmitting and receiving data with an Internet protocol by using various wired and wireless communication technologies such as an Internet network, an intranet network, a mobile communication network, and a satellite communication network. Also, the communication network is coupled with the membership card managing server 300 and stores computing resources such as hardware and software. Such a communication network includes a closed-type network such as a LAN (Local Area Network) or WAN (Wide Area Network), an open-type network such as Internet, a network such as CDMA (Code Division Multiple Access), WCDMA (Wideband Code Division Multiple Access), GSM (Global System for Mobile Communications), LTE (Long Term Evolution), or EPC (Evolved Packet Core), and next-generation networks and computing networks to be implemented in the future.

Additionally, the communication network 500 includes a plurality of access networks (not shown) and a core network (not shown), and may further include an external network, e.g., Internet (not shown). Here, the access network is to perform wired/wireless communication with the user terminal 100 and may be formed of a plurality of base stations, also referred to as BTS (Base Transceiver Station), NodeB, or eNB (eNodeB or evolved Node B), and controllers such as BSC (Base Station Controller) and RNC (Radio Network Controller).

Additionally, instead of such a base station that includes a digital signal processor and a radio signal processor, a plurality of radio units (not shown) corresponding to the radio signal processor may be disposed respectively at a plurality of regions and connected to a centralized digital unit (not shown) corresponding to the digital signal processor.

The core network which forms a mobile network together with the access network performs a function to connect the access network and the external network such as Internet.

The core network is a network system that performs main functions for a mobile communication service such as mobility control and switching between the access networks. Namely, the core network performs circuit switching or packet switching and further manages and controls a packet flow in the mobile network. In addition, the core network may manage mobility between frequencies, control traffic therein and in the access network, and control interworking with other network such as Internet. The core network may be formed of SGW (Serving GateWay), PGW (PDN GateWay), MSC (Mobile Switching Center), HLR (Home Location Register), MME (Mobile Mobility Entity), HSS (Home Subscriber Server), and/or the like.

The Internet is a world common network through which information is exchanged according to TCP/IP protocol. The Internet is connected to the membership card managing server 300 and may deliver information, offered from the membership card managing server 300, to the first and second user terminals 100 and 200 through the core network and the access network.

Figure 2:
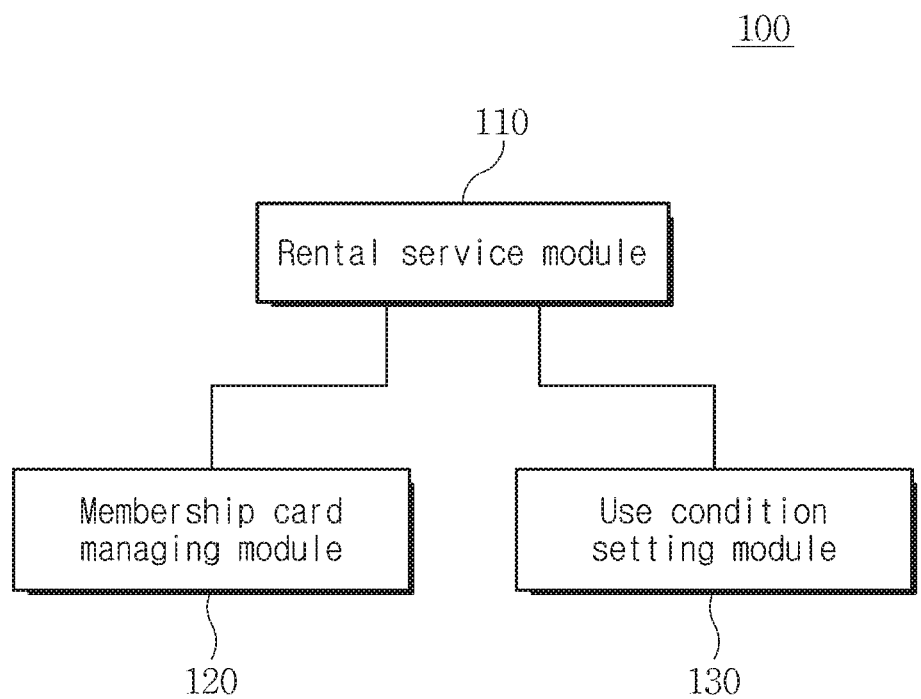
FIG. 2 is a diagram illustrating a main configuration of a first user terminal according to an embodiment of the present invention.

Hereinafter, referring to FIG. 2, FIG. 2 is a diagram illustrating a main configuration of the first user terminal 100 according to an embodiment of the present invention.

Referring to FIG. 2, the first user terminal according to an embodiment of this invention may include a rental service module 110, a membership card managing module 120, and a use condition setting module 130.

The rental service module 110 according to an embodiment of this invention performs a function of providing a membership card rental service. Specifically, when there is a membership card rental request, the rental service module 110 may select the second user terminal 200 that rents a membership card, from among other user terminals detected through a short-range wireless communication function, selects a membership card to be rented to the second user terminal, and provide membership card information through the short-range wireless communication function.

The membership card rental request is caused by a request signal entered by a user of the first user terminal 100 in order for the user of the first user terminal 100 to offer a membership card registered with his or her account to other user.

In an embodiment of this invention, the membership card rental request is caused by a request from the user of the first user terminal 100. However, the membership card rental request may be also performed at the second user terminal. Namely, a user of the second user terminal 200 may detect the first user terminal 100 activating a short-range wireless communication function and then request a membership card rental so as to rent the membership card.

Additionally, the rental service module 110 according to an embodiment of this invention may switch the membership card to an inactivated mode at the first user terminal 100 so as to prevent the use of the membership card at the first user terminal 100 during the use of the membership card at the second user terminal 200. This may prevent conflicts as to the use of the membership card.

Also, when the membership card is switched to an inactivated mode at the first user terminal 100, the rental service module 110 according to an embodiment of this invention switches the membership card to an activated mode at the first user terminal 100.

At this time, the second user terminal 200 placed in an activated mode may request the use of the membership card from the membership card managing server 300.

The rental service module 110 according to an embodiment of this invention receives an authorization request from the membership card managing server 300 and then authorizes the second user terminal 200 to use the membership card by receiving an input of signature or password for performing authorization in response to the request. Namely, the authority for a future use of the membership card is transferred from the first user terminal 100 to the second user terminal 200.

Thereafter, the rental service module 100 according to an embodiment of this invention may withdraw the membership card rented to the second user terminal 200. At this time, the first user terminal 100 may be switched to an activated mode of the membership card, and the second user terminal 200 may delete the membership card information received from the first user terminal 100 and stored or be switched to an inactivated mode.

Also, when the membership card rented to the second user terminal 200 is withdrawn, the rental service module according to an embodiment of this invention may set and control the range of a signal emitted from the first user terminal 100 by adjusting emitting signal strength of the short-range wireless communication function and, through this, release a short-range wireless communication connection from the second user terminal 200.

For example, in a state where the first and second user terminals 100 and 200 are connected with each other through short-range wireless communication and also a membership card authority is rented to the second user terminal 200, the first user terminal 100 may adjust emitting signal strength to reduce the signal strength. Therefore, if the emitting signal does not arrive at the second user terminal 200, the first user terminal 100 fails to detect the second user terminal 200 and also the short-range wireless communication connection is released such that the rented membership card can be withdrawn to the first user terminal 100.

Even though the first user terminal 100 does not adjust the emitting signal strength in a state where the first and second user terminals 100 and 200 are connected with each other through short-range wireless communication and also a membership card authority is rented to the second user terminal 200, the short-range wireless communication connection may be released to withdraw the rented membership card to the first user terminal 100 when the emitting signal does not reach the second user terminal 200 because the first user terminal 100 is away from more than a certain distance.

Namely, in a state where the first and second user terminals 100 and 200 are connected with each other through short-range wireless communication and also a membership card authority is rented to the second user terminal 200, the membership card rented to the second user terminal 200 may be withdrawn to the first user terminal 100 when the short-range wireless communication between the first and second user terminals 100 and 200 is released.

When the membership card is withdrawn, the rental service module 110 according to an embodiment of this invention may delete the membership card information stored in the second user terminal 200.

Also, the rental service module 110 according to an embodiment of this invention may analyze received signal strength, or a variation thereof, of a short-range wireless communication signal received from the second user terminal 200 and, depending on the received signal strength, determine whether to withdraw the membership card.

Namely, if no signal is detected from the second user terminal 200 or if signal strength is less than a threshold in a state where the first and second user terminals 100 and 200 are connected with each other through short-range wireless communication and also a membership card authority is rented to the second user terminal 200, the first user terminal 100 may determine whether to withdraw the membership card and display a notification message resulting from determination on the first user terminal 100.

Also, if no signal is detected from the second user terminal 200 or if signal strength is less than a threshold in a state where the first and second user terminals 100 and 200 are connected with each other through short-range wireless communication and also a membership card authority is rented to the second user terminal 200, the first user terminal 100 may display thereon a withdrawal message for indicating whether to approve or cancel the withdrawal of the membership card.

Also, if the signal strength is reduced rapidly or received in a specific pattern or regular rule in a state where the first and second user terminals 100 and 200 are connected with each other through short-range wireless communication and also a membership card authority is rented to the second user terminal 200, the first user terminal 100 may determine whether to withdraw the membership card and display a notification message resulting from determination on the first user terminal 100.

Also, if the signal strength is reduced rapidly or received in a specific pattern or regular rule in a state where the first and second user terminals 100 and 200 are connected with each other through short-range wireless communication and also a membership card authority is rented to the second user terminal 200, the first user terminal 100 may display thereon a withdrawal message for inquiring whether to withdraw the membership card.

Now, operations of the membership card managing module 120 of the first user terminal 100 according to an embodiment of this invention will be described.

The membership card managing module 120 according to an embodiment of this invention, which is to manage one or more membership cards of the first user terminal 100, may manage information about the membership card and the activation or not of the membership card.

Namely, the membership card managing module 120 according to an embodiment of this invention may store a membership card of a user account used by the user of the first user terminal 100 and manage at least one of user information, terminal information, discount information, and saving information with regard to each membership card.

In addition, the membership card managing module 120 according to an embodiment of this invention may store a history of activated or inactivated mode of the membership card at the first user terminal 100 and also manage at least one of a related time, the second user terminal information, and a cumulative number.

Next, the use condition setting module 130 according to an embodiment of this invention will be described.

Before or after the first user terminal 100 sends the membership card information to the second user terminal 200, the use condition setting module 130 according to an embodiment of this invention may set at least one of a usable count, a usage limit, and an expiration with regard to the membership card so as to prevent an additional or fraudulent use of the membership card at the second user terminal 200.

Now, a short-range wireless communication connection between the first user terminal 100 and the second user terminal 200 according to an embodiment of this invention will be described.

Figure 3:
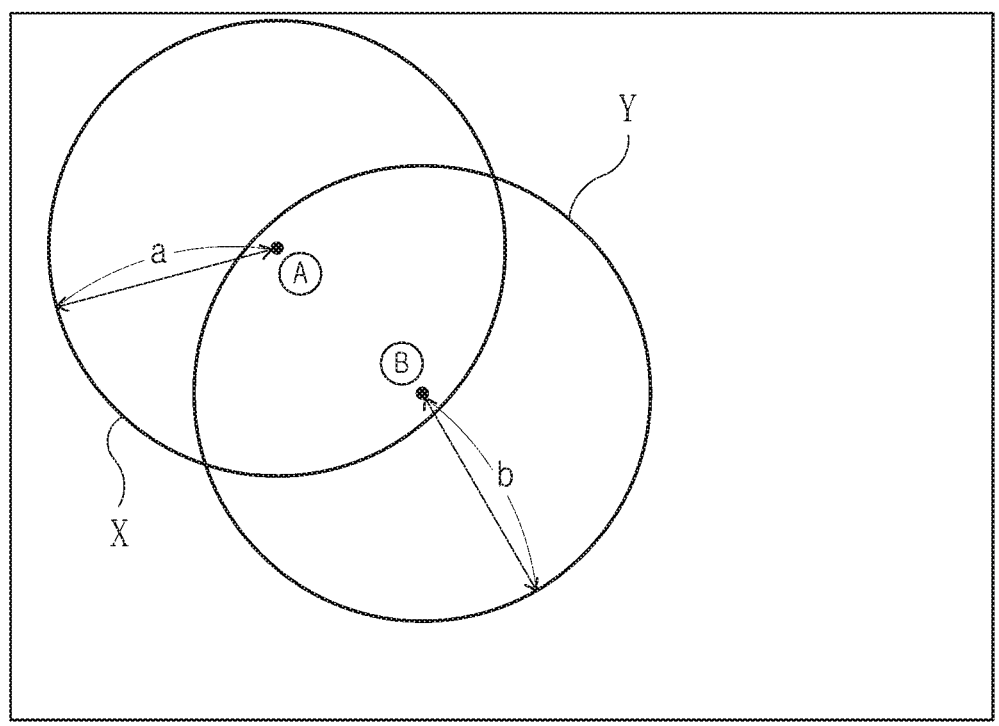
FIG. 3 is an exemplary diagram illustrating a process of establishing a short-range wireless communication connection between a first user terminal and a second user terminal according to an embodiment of the present invention.

FIG. 3 is an exemplary diagram illustrating a process of establishing a short-range wireless communication connection between a first user terminal and a second user terminal according to an embodiment of the present invention.

Referring to FIG. 3, "A" denotes the location of the first user terminal 100, "X" denotes the range of a signal emitted from the first user terminal 100, and "a" denotes a radius of the range of a signal emitted from the first user terminal 100.

Similarly, "B" denotes the location of the second user terminal 200, "Y" denotes the range of a signal emitted from the second user terminal 200, and "b" denotes a radius of the range of a signal emitted from the second user terminal 200.

Here, "a" and "b" are settable at each user terminal, and the respective ranges "X" and "Y" may be varied according to "a" and "b".

In FIG. 3, the ranges of signals emitted from the first and second user terminals 100 and 200 are overlapped partially with each other. This means that the first and second user terminals 100 and 200 are connected with each other through short-range wireless communication.

At this time, the first user terminal 100 may transmit membership card information to the second user terminal 200, perform authorization, and rent out the membership card.

Now, the case where a short-range wireless communication connection between the first and second user terminals 100 and 200 is released will be described through an exemplary diagram.

Figure 4A:
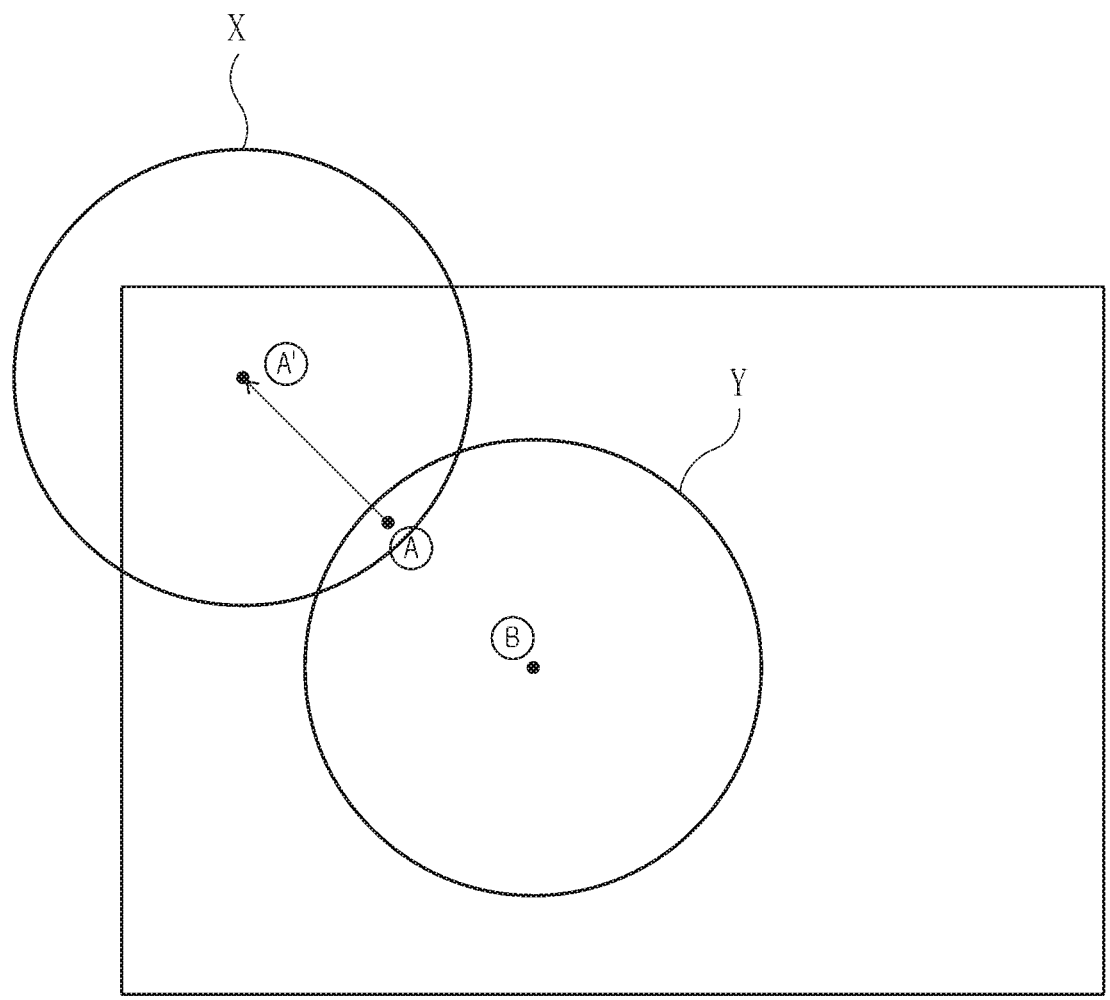
FIGS. 4A and 4B are exemplary diagrams illustrating a process of releasing a short-range wireless communication connection between a first user terminal and a second user terminal according to an embodiment of the present invention.
Figure 4B:
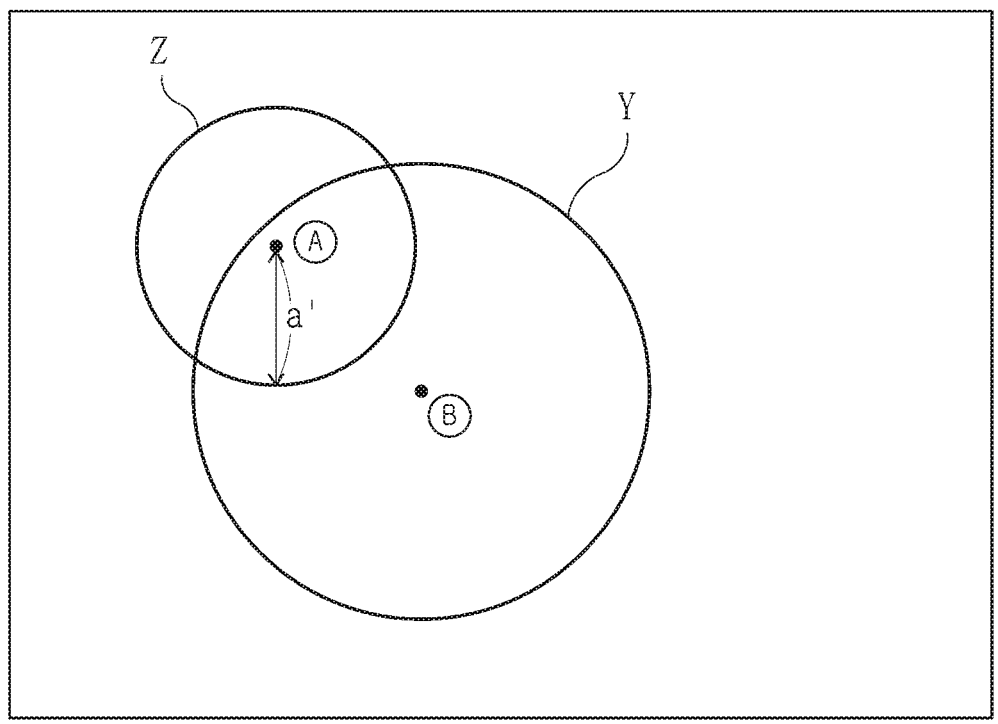

FIGS. 4A and 4B are exemplary diagrams illustrating a process of releasing a short-range wireless communication connection between a first user terminal and a second user terminal according to an embodiment of the present invention.

FIGS. 4A and 4B show that the short-range wireless communication connection between the first and second user terminals 100 and 200 as shown in FIG. 3 is released.

Referring to FIG. 4A first, the short-range wireless communication connection may be released due to the movement of a user terminal.

In FIG. 4A, "A" denotes the location of the first user terminal 100, and "X" denotes the range of a signal emitted from the first user terminal 100. Similarly, "B" denotes the location of the second user terminal 200, and "Y" denotes the range of a signal emitted from the second user terminal 200.

Further, "A'" denotes the location of the first user terminal 100 after moved. If the first user terminal 100 does not adjust the signal emission strength, the range "X" of an emitting signal is maintained.

Namely, FIG. 4A shows that the first user terminal 100 connected with the second user terminal 200 through short-range wireless communication is moved and therefore the short-range wireless communication connection is released.

Although FIG. 4A shows that the first user terminal 100 is moved, this is exemplary only. When the second user terminal is moved, when both the first and second user terminals are moved, or when a distance between the first and second user terminals exceeds the signal range, the short-range wireless communication connection may be released.

Additionally, when the short-range wireless communication connection is released between the first and second user terminals 100 and 200, the membership card transferred from the first user terminal 100 to the second user terminal 200 may be withdrawn to the first user terminal 100. Also, membership card information stored in the second user terminal 200 may be deleted such that an additional or fraudulent use of the membership card can be prevented at the second user terminal 200.

Next, referring to FIG. 4B, the short-range wireless communication connection may be released due to the movement of a user terminal.

In FIG. 4B, "A" denotes the location of the first user terminal 100, and "B" denotes the location of the second user terminal 200.

Also, "Z" denotes the range of a short-range wireless communication signal emitted from the first user terminal 100, and "a" denotes a radius of the range "Z".

Compared to the range "X" of a signal emitted from the first user terminal 100 and the radius "a" thereof as shown in FIG. 4A, it can be seen that the strength of a signal emitted from the first user terminal 100 is adjusted to be reduced.

Additionally, since the signal range "Z" in FIG. 4B does not reach the location "B" of the second user terminal 200, the first user terminal 100 fails to detect the second user terminal 200.

Therefore, in a state where the first and second user terminals 100 and 200 are connected through short-range wireless communication, the connection between the first and second user terminals 100 and 200 may be released according as the range of a signal emitted from the first user terminal 100 is changed from "X" to "Z" as shown in FIG. 4B.

In addition, when the short-range wireless communication connection between the first and second user terminals 100 and 200 is released due to a reduction in the signal range of the first user terminal 100, the membership card delivered from the first user terminal 100 to the second user terminal 200 may be withdrawn to the first user terminal 100. Also, membership card information stored in the second user terminal 200 may be deleted such that an additional or fraudulent use of the membership card can be prevented at the second user terminal 200.

In this case, the short-range wireless communication connection may be released due to a reduction in the signal range resulting from a variation of signal strength of the second user terminal 200 as well as a reduction in the signal range resulting from a variation of signal strength of the first user terminal 100.

Figure 5:
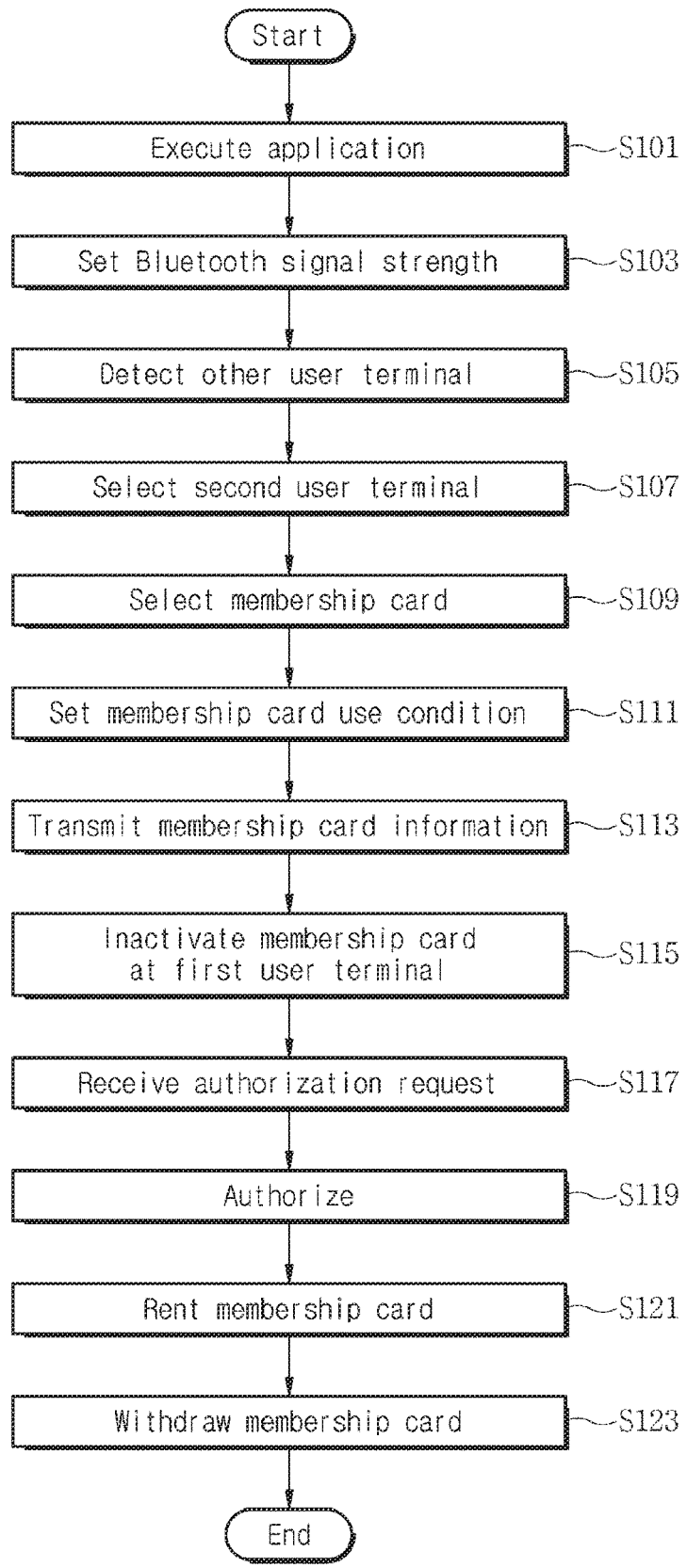
FIG. 5 is a flow diagram illustrating a membership card rental service method according to an embodiment of the present invention.

The following relates to a membership card rental service method according to an embodiment of this invention. FIG. 5 is a flow diagram illustrating a membership card rental service method according to an embodiment of the present invention.

Referring to FIG. 5, the membership card rental service method at the first user terminal 100 according to an embodiment of this invention executes an application stored in the first user terminal 100 (S101) and sets Bluetooth signal strength by activating Bluetooth communication of the first user terminal 100 (S103).

Here, the application is an electronic wallet application stored in the user terminal and offers the membership card rental service according to an embodiment of this invention. Additionally, the Bluetooth communication is short-range wireless communication technique. Although this invention is described to use the Bluetooth communication, this is exemplary only. Any communication technique capable of transmitting and receiving data through wireless communication may be applicable to this invention.

At step S103, setting of the Bluetooth signal strength corresponds to setting of the strength of a signal emitted from the first user terminal 100. This signal strength may be arbitrarily set depending on the location of the second user terminal 200, the user of the first user terminal 100 desires to connect, or automatically set after calculation of a distance. Also, the signal strength may be set as a default value and then adjusted by the user. In these cases, information about standard signal strength depending on a distance from the user terminal may be displayed.

Thereafter, if there is a request for the membership card rental service, the first user terminal 100 detects other user terminals within the signal range based on the signal strength set at step S103 (S105). Here, the other user terminal is in a state where the application and the Bluetooth function are activated.

The first user terminal 100 according to an embodiment of this invention selects the second user terminal, to which the membership card of the first user terminal 100 will be rented, from among the other user terminals detected at step S105 (S107). Also, the first user terminal 100 selects the membership card to be rented out (S109).

The above-discussed service method is to select the second user terminal 200 in response to a request of the first user terminal 100 and then select the membership card. This is, however, exemplary only. Alternatively, the second user terminal 200 may select the first user terminal 100 and then request a specific membership card, and therefore the first user terminal 100 may offer the requested membership card.

After step S109, the membership card rental service method according to an embodiment of this invention may set a use condition regarding the membership card to be rented out (S111). The use condition includes at least one of a usable count, a usage limit, and an expiration with regard to the membership card so as to prevent an additional or fraudulent use of the membership card at the second user terminal 200.

Thereafter, the first user terminal 100 transmits membership card information to the second user terminal 200 (S113) and, for the membership card rental service, switches the membership card to an inactivated mode at the first user terminal 100 (S115).

In addition, as the membership card is inactivated at the first user terminal 100, the membership card rented to the second user terminal 200 is switched to an activated mode.

Then, the first user terminal 100 receives an authorization request for the use of the membership card at the second user terminal 200 (S117) and then performs authorization (S119).

The authorization for the membership card is performed in response to the request of the second user terminal 200 for using the membership card. The first user terminal 100 may authorize the rented membership card by entering a signature or password.

Through the above process, the authority of the membership card is transferred to the second user terminal 200, and the rental of the membership card is approved (S121).

Thus, the second user terminal 200 may use the membership card according to the use condition which is set by the first user terminal at step S111. If the use condition is not satisfied, the authority of the membership card is stopped and thus the membership card stored in the second user terminal 200 may be switched to an inactivated mode or membership card information stored in the second user terminal 200 may be deleted.

After the rental of the membership card is approved (S121), the first user terminal 100 withdraws the membership card delivered to the second user terminal (S123). The withdrawal of the membership card may be performed at a request of the user of the first user terminal 100. In this case, the membership card inactivated at the first user terminal 100 may be switched to an activated mode, and the membership card activated at the second user terminal 200 may be switched to an inactivated mode. Also, the membership card information stored in the second user terminal 200 may be deleted.

Additionally, the withdrawal of the membership card may be performed when a distance between the first and second user terminals 100 and 200 is increased to incur no detection of an emission signal and thereby when the short-range wireless communication connection, e.g., Bluetooth, is released.

Also, when the signal strength of the first user terminal 100 is adjusted to reduce the signal range and thereby when the short-range wireless communication connection, e.g., Bluetooth, is released, the withdrawal of the membership card may be performed.

The following relates to a method in which the first user terminal 100 performs authorization for the use of the membership card of the second user terminal 200 in the membership card rental service method.

Figure 6:
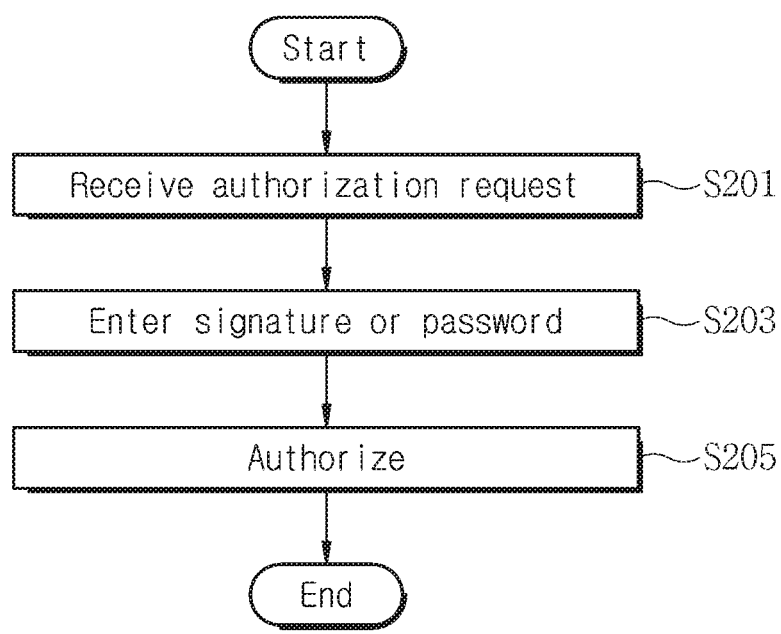
FIG. 6 is a flow diagram illustrating a method for performing authorization according to an embodiment of the present invention.

FIG. 6 is a flow diagram illustrating a method for performing authorization according to an embodiment of the present invention.

FIG. 6 is associated with steps S117~S119 in FIG. 5 and relates to a method in which the first user terminal 100 performs authorization for the membership card. If the second user terminal 200 requests the use of the membership card from the membership card managing server 300, the first user terminal 100 may receive the authorization request of the second user terminal 200 from the membership card managing server 300 (S201), enter a signature or password (S203), and thereby authorize the rented membership card (S205).

Figure 7:
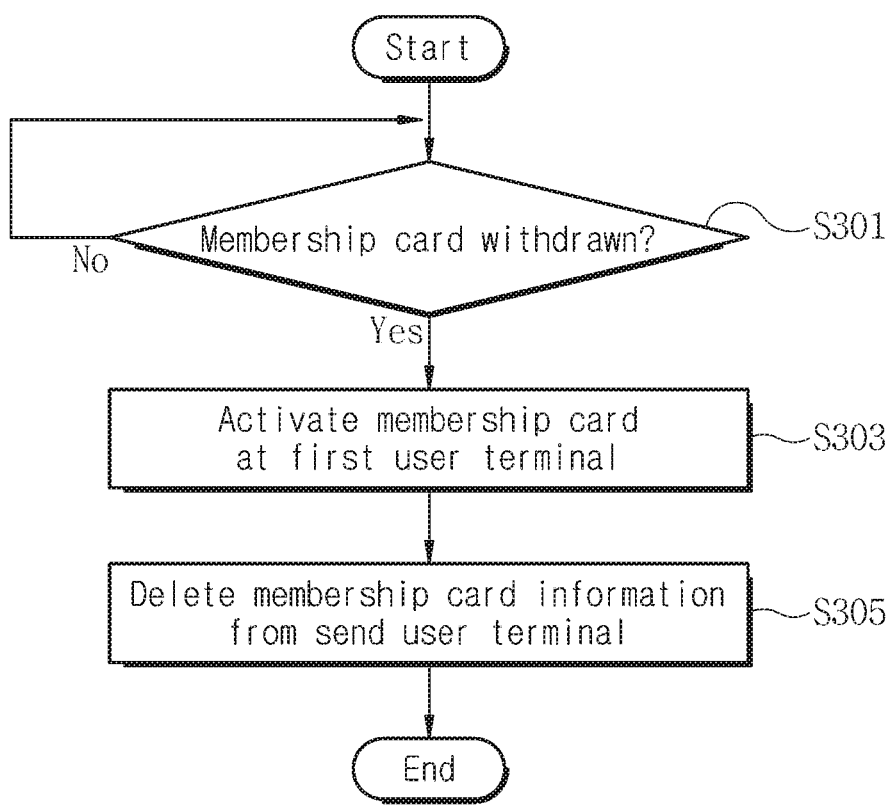
FIG. 7 is a flow diagram illustrating a process of withdrawing a membership card of a first user terminal according to an embodiment of the present invention.

FIG. 7 is a flow diagram illustrating a process of withdrawing a membership card of a first user terminal according to an embodiment of the present invention.

Referring to FIG. 7, FIG. 7 shows a method in which the first user terminal 100 rents the membership card to the second user terminal and then withdraws the rented membership card.

At the outset, the first user terminal 100 determines whether to withdraw the membership card (S301). In case of withdrawing the membership card, the membership card is switched to an activated mode at the first user terminal 100 (S303), and the membership card is switched to an inactivated mode at the second user terminal 200 or the membership card information stored in the second user terminal 200 is deleted (S305). Through this, if the user of the first user terminal 100 desires to the withdrawal of the membership card, the usage authority for the membership card is stopped at the second user terminal 200 and the use of the membership card becomes impossible.

Now, the entire service procedure of a membership card according to an embodiment of this invention will be described.

Figure 8:
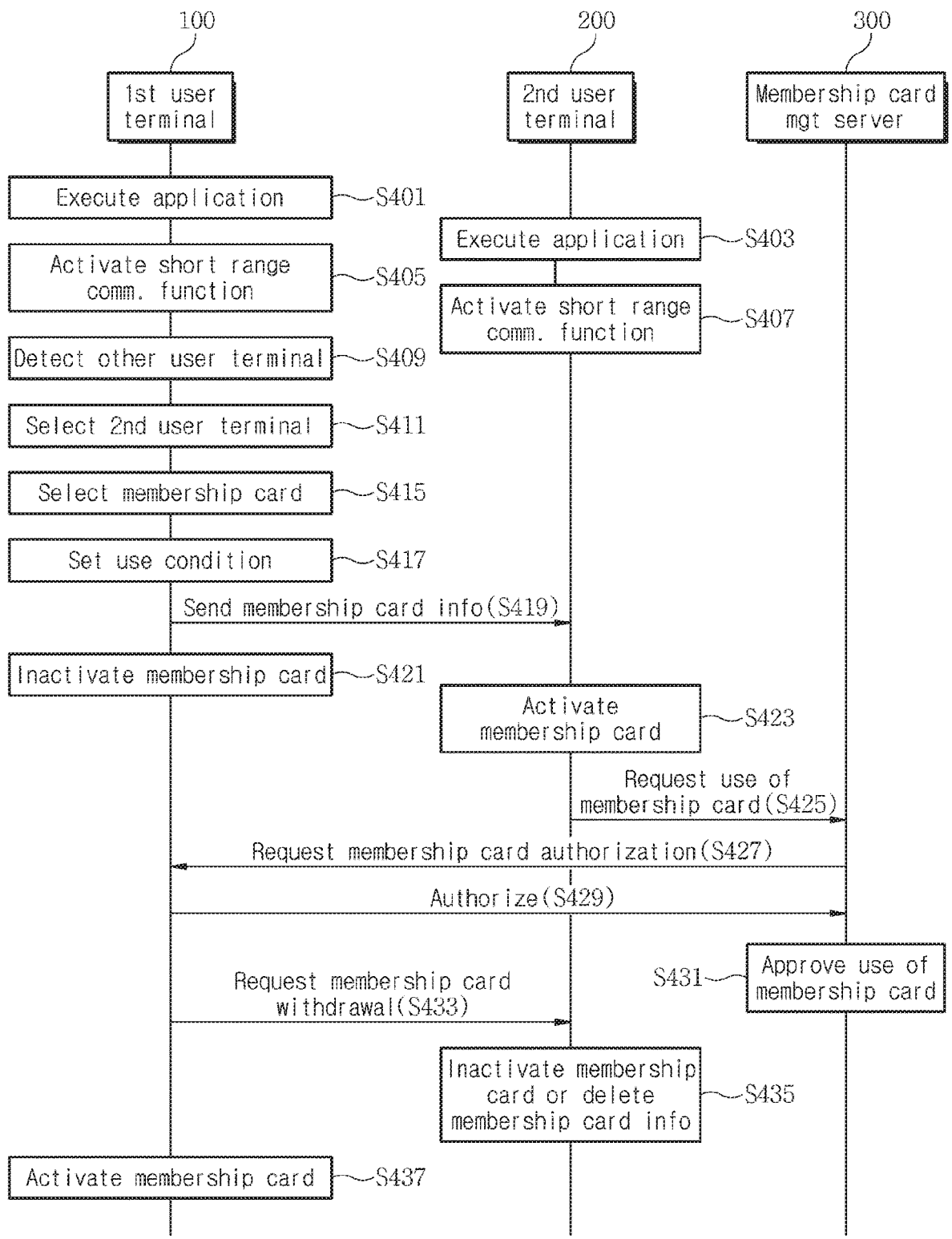
FIG. 8 is a diagram illustrating a membership card rental service procedure according to an embodiment of the present invention.

FIG. 8 is a diagram illustrating a membership card rental service procedure according to an embodiment of the present invention.

Referring to FIG. 8, the membership card rental service procedure may be performed through transmission/reception of data among the first user terminal 100, the second user terminal 200, and the membership card managing server 300.

At the outset, the first and second user terminals 100 and 200 should execute an application (S401, S403) and activate a short-range communication function (S405, S407).

Then, the first user terminal 100 may detect, within the range of an emitting signal through the short-range communication, other user terminals which execute the application and activate the short-range communication function (S409). Also, the first user terminal 100 selects, from among the detected other user terminals, the second user terminal 200 to which the membership card will be rented (S411).

Additionally, the first user terminal 100 selects the membership card to be rented to the second user terminal 200 from among one or more membership cards registered with a user account (S415), and then sets a user condition including at least one of a usable count, a usage limit, and an expiration with regard to the membership card (S417). The use condition set by the user of the first user terminal 100 may prevent an additional or fraudulent use of the membership card.

The first user terminal 100 transmits membership card information including the use condition for the selected membership card to the second user terminal 200 (S419). Then the membership card is switched to an inactivated mode at the first user terminal 100 (S421), and the membership card is switched to an activated mode at the second user terminal 200 (S423).

The second user terminal 200 that stores the membership card switched to the activated mode transmits a request for using the membership card to the membership card managing server 300 (S425). Then the membership card managing server 300 that manages authorization information about membership cards at the first and second user terminals 100 and 200 may request, based on account information of the membership card, the first user terminal 100 to authorize the use of the membership card (S427).

The first user terminal 100 that receives the request for authorization of the rented membership card from the membership card managing server 300 may perform authorization by entering a signature or password (S429).

After the authorization at the first user terminal 100, the membership card managing server 300 approves the use of the membership card in response to the request for the use of the membership card received at step S425 (S431). Through this process, the second user terminal 200 may use the membership card offered from the first user terminal as its own membership card.

At this time, a usage history of the second user terminal 200 may be sent to and displayed on the first user terminal 100. The second user terminal 200 may use the membership card under the use condition set at step S417. In case of being out of the use condition, this may be notified to the first user terminal 100, and therefore the first user terminal 100 may withdraw the membership card.

After the second user terminal 200 uses the membership card, and if the first user terminal 100 desires to withdraw the membership card, the first user terminal 100 creates a signal for requesting the withdrawal of the membership card and then transmits this request signal to the second user terminal (S433). In response to this request from the first user terminal 100, the membership card stored in the second user terminal may be switched to the inactivated mode or information thereof is deleted (S435). Also, the membership card may be switched again to the activated mode at the first user terminal 100 (S435).

Then the membership card rental service according to an embodiment of this invention is terminated.

Figure 9:
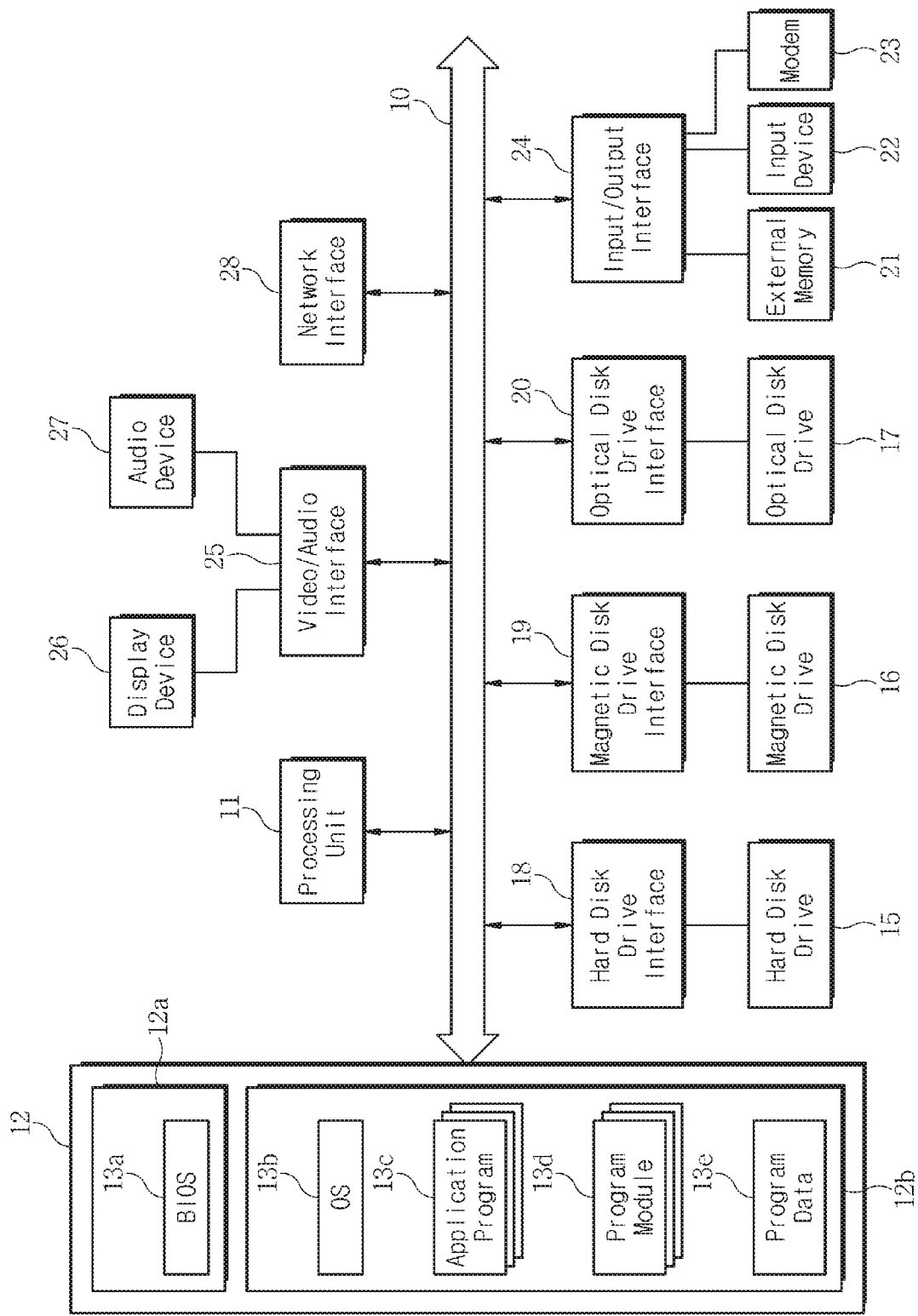
FIG. 9 is a diagram illustrating an operating environment of a user terminal according to an embodiment of the present invention.

FIG. 9 is a diagram illustrating an operating environment of a user terminal according to an embodiment of the present invention.

FIG. 9 is a diagram illustrating an operating environment of a user terminal for providing a membership card rental service according to an embodiment of the present invention.

FIG. 9 and the following discussion are intended to provide a brief, general description of an example suitable computing environment in which the invention may be implemented. Although not required (e.g., when implemented in hardware), the invention will be described in the general context of computer-executable instructions, such as program modules, being executed by computer systems.

Generally, program modules include routines, programs, objects, components, data structures, and the like, which perform particular tasks or implement particular abstract data types.

Computer-executable instructions, associated data structures, and program modules represent examples of the program code means for executing acts of the methods disclosed herein.

Referring to FIG. 9, an exemplary computing system for implementing the invention includes a processing unit 11, a system memory 12, and a system bus 10 that couples various system components including the system memory 12 to the processing unit 11. The processing unit 11 can execute computer-executable instructions designed to implement features of this invention.

The system bus 10 may be any of several, types of bus structures including a memory bus or memory controller, a peripheral bus, and a local bus using any of a variety of bus architectures. The system memory 12 includes read only memory (ROM) 12a and random access memory (RAM) 12b.

A basic input/output system (BIOS) 13a, containing the basic routines that help transfer information between elements within computer system, such as during start-up, may be stored in the ROM 12a.

The computing system may also include a storage unit, e.g., a hard disk drive 15 for reading from and writing to a hard disk, a magnetic disk drive 16 for reading from or writing to a magnetic disk, and an optical disk drive 17 for reading from or writing to an optical disk such as a CD-ROM or other optical media.

The hard disk drive 15, the magnetic disk drive 16, and the optical disk drive 17 are connected to the system bus 10 by a hard disk drive interface 18, a magnetic disk drive-interface 19, and an optical drive interface 20, respectively.

Additionally, the computing system may further include an external memory 21 as the storage unit. The external memory 21 may be connected to the system bus 10 through an input/output interface 24.

The drives and their associated computer-readable media provide nonvolatile storage of computer-executable instructions, data structures, program modules, and other data for the computing system. Although the example environment described herein employs the hard disk 15, the magnetic disk 16 and the optical disk 17, other types of computer readable media for storing data can be used, including magnetic cassettes, flash memory cards, digital versatile disks, Bernoulli cartridges, RAMs, ROMs, and the like.

Program code means including one or more program modules, such as an operating system 13b, one or more application programs 13c, other program modules 13d, and program data 13e, may be stored on the hard disk 15, the magnetic disk 16, the optical disk 17, the ROM 12a, or the RAM 12b. Particularly, in this invention, one or more program modules may include program modules corresponding to the rental service module 110, the membership card managing module 120, and the use condition setting module 130 which are discussed in FIG. 2.

A user may enter commands and information into the computing system through other input device 22 such as a keyboard, a pointing device, a microphone, a joy stick, a game pad, or the like. This other input device 22 can be connected to the processing unit 11 through the input/output interface 24 coupled to the system bus 10.

The input/output interface 24 may logically represent any of a wide variety of different interfaces, such as, for example, a serial port interface, a PS/2 interface, a parallel port interface, a universal serial bus (USB) interface, or an institute of electrical and electronics engineers (IEEE) 1394 interface (i.e., a FireWire interface), or may even logically represent a combination of different interfaces.

Additionally, the computing system may further include a display device 26 such as a monitor or LCD and/or an audio device 27 such as a speaker or a microphone, which are connected to the system bus 10 via a video/audio interface 25.

For example, any other peripheral output device (not shown) such as a speaker and a printer may be also connected to the computer system 420.

The video/audio interface 25 may include high definition multimedia interface (HDMI), graphics device interface (GDI), or the like.

The computing system is connectable to networks, such as, for example, an office-wide or enterprise-wide computer network, a home network, an intranet, and/or the Internet.

The computing system can exchange data with external sources, such as, for example, remote computer systems, remote applications, and/or remote databases over such networks.

The computing system includes a network interface 28, through which the computing system receives data from external sources and/or transmits data to external sources. The network interface 28 facilitates the exchange of data with remote devices.

For example, the network interface 28 of the user terminal according to an embodiment of this invention may detect and be connect with other user terminal through Bluetooth communication. However, the network interface 28 is not limited to Bluetooth communication, and any other short-range wireless communication and wired/wireless internet communication may be included.

For example, if the computing system is the first user terminal 100, this may detect the second user terminal 200 through Bluetooth communication and be connected with the second user terminal 200 so as to transmit or receive membership card information.

Also, if the computing system is the first user terminal 100, this may transmit or receive information to or from the membership card managing server 300 through wired/wireless communication.

The network interface 28 can logically represent one or more software and/or hardware modules, such as, for example, a network interface card and corresponding network driver interface specification (NDIS) stack.

Likewise, the computing system receives and/or transmits data from and/or to external sources through the input/output interface 24.

The input/output interface 24 is coupled to a modem 23 (e.g., a standard modem, a cable modem, or a digital subscriber line (DSL) modem), through which the computing system receives data from and/or transmits data to external sources.

While FIG. 9 represents a suitable operating environment for the present invention, the principles of the present invention may be employed in any system that is capable of, with suitable modification if necessary, implementing the principles of the present invention.

The environment illustrated in FIG. 9 is illustrative only and by no means represents even a small portion of the wide variety of environments in which the principles of the present invention may be implemented.

Various kinds of information generated during the execution of the membership card rental service program of this invention may be stored and accessed from any of the computer-readable media associated with the computing system as shown in FIG. 9.

For example, portions of such modules and portions of associated program data may be included in the operating system 13b, the application programs 13c, the program modules 13d and/or the program data 13e, for storage in the system memory 12. When a mass storage device such as the hard disk is coupled to the computing system, such modules and associated program data may also be stored in the mass storage device.

In a networked environment, program modules depicted relative to the computing system, or portions thereof, can be stored in a remote computer system, e.g., a computing system of the first user terminal 100, the second user terminal 200, the membership card managing server 300, or the membership card providing server 400, connected through the modem 23 or network interface 25 of the input/output interface 24. Execution of such modules may be performed in a distributed environment as previously described.

While the specification contains many specific implementation details, these should not be construed as limitations on the scope of any disclosure or of what may be claimed, but rather as descriptions of features that may be specific to particular embodiments of particular disclosures.

Certain features that are described in the specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

Certain embodiments of the subject matter have been described. Other embodiments are within the scope of the following claims. For example, the operations recited in the claims may still be performed in a different order and still achieve desirable results.

By way of example, the process illustrated in the accompanying drawings does not necessarily require that particular illustrated or sequential order to obtain the desired results. In certain implementations, multitasking and parallel processing may be advantageous.

The description sets forth the best mode of the present invention, and is provided to illustrate the invention and to enable those skilled in the art to make and use the invention. The written description is not intended to limit the invention to the specific terminology presented. Therefore, while the present invention has been described in detail with reference to the above examples, those skilled in the art will be able to make adaptations, modifications, and variations on these examples without departing from the scope of the present invention.

Therefore, the scope of the present invention should not be limited by the described embodiments but should be defined by the claims.

While this disclosure has been particularly shown and described with reference to an exemplary embodiment thereof, it will be understood by those skilled in the art that various changes in form and details may be made therein without departing from the scope of this disclosure as defined by the appended claims.

INDUSTRIAL APPLICABILITY

The present invention relates to a membership card rental service method and an apparatus therefor. Specifically, a membership card stored in an electronic wallet application of a user terminal can be rented out and withdrawn for use by other user terminal between user terminals having a short-range wireless communication function so that the membership card can be rented more securely without risk of exposure of personal information.

This can contribute to the development of the service industry, and the present invention has a good possibility of sales on the market or business and also has industrial applicability suitable for practical and apparent implementation.

The invention claimed is:

1. A user terminal having a short-range wireless communication function, the user terminal comprising:
   a rental service module configured to:
      transmit membership card information to another user terminal through short-range wireless communication responsive to receiving a membership card rental request to rent membership associated with a membership card to the other user terminal,
      switch the membership card to an inactivated mode at the user terminal responsive to transmitting the membership card information to the other user terminal,
      withdraw the membership card from the other user terminal responsive to a signal strength of a signal of the short-range wireless communication from the other user terminal dropping below a threshold level, and
      switch the inactivated mode to an activated mode responsive to the membership card being withdrawn from the other user terminal; and
   a membership card managing module configured to manage the membership card information and an activation of the membership card.

2. The user terminal of claim 1, further comprising:
a use condition setting module configured to set at least one of a usable count, a usage limit, and an expiration with regard to use of the membership card rented to the other user terminal.

3. The user terminal of claim 1, wherein the rental service module is further configured to perform authorization on transmitting the membership card information to the other user terminal by entering a signature or password responsive to receiving the membership card rental request.

4. The user terminal of claim 1, wherein the rental service module is further configured to switch the membership card to the activated mode at the other user terminal when switching the membership card to the inactivated mode at the user terminal.

5. The user terminal of claim 1, wherein the rental service module is further configured to delete membership card information from the other user terminal or to switch the membership card stored in the other user terminal to the inactivated mode when the membership card is withdrawn.

6. The user terminal of claim 1, wherein the rental service module is further configured to release a short-range wireless communication connection from the other user terminal by adjusting emission signal strength of the short-range wireless communication function responsive to rental of the membership card being withdrawn from the other user terminal.

7. A membership card rental service method comprising steps of:
at a user terminal, detecting another user terminal through short-range wireless communication;
at the user terminal, receiving a membership card rental request to rent membership associated with the membership card to the other user terminal;
transmitting membership card information from the user terminal to the other user terminal through the short-range wireless communication;
at the user terminal, switching a membership card to an inactivated mode at the user terminal responsive to transmitting the membership card information to the other user terminal;
at the user terminal, withdrawing the membership card from the other user terminal responsive to a signal strength of a signal of the short-range wireless communication from the other user terminal dropping below a threshold level;
at the user terminal, switching the inactivated mode to an activated mode responsive to the membership card being withdrawn from the other user terminal; and
at the user terminal, managing the membership card information and an activation of the membership card.

8. The method of claim 7, wherein the transmitting of the membership card information comprises setting at least one of a usable count, a usage limit, and an expiration with regard to use of the membership card rented to the other user terminal.

9. The method of claim 7, further comprising:
performing authorization by entering a signature or password responsive to receiving the membership card rental request.

10. The method of claim 7, wherein the switching to the inactivated mode includes switching the membership card to the activated mode at the other user terminal.

11. The method of claim 7, wherein the switching to the activated mode includes deleting the membership card information from the other user terminal or switching the membership card stored in the other user terminal to the inactivated mode responsive to the membership card being withdrawn.

12. The method of claim 7, wherein the switching to the activated mode includes releasing a short-range wireless communication connection from the other user terminal by adjusting emission signal strength of the short-range wireless communication function when the membership card is withdrawn.

\* \* \* \* \*